United States Patent
Barsness et al.

(10) Patent No.: US 7,925,648 B2
(45) Date of Patent: Apr. 12, 2011

(54) DYNAMICALLY SELECTING ALTERNATIVE QUERY ACCESS PLANS

(75) Inventors: Eric Lawrence Barsness, Pine Island, MN (US); Mahdad Majd, Rochester, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 11/839,926

(22) Filed: Aug. 16, 2007

(65) Prior Publication Data
US 2007/0282794 A1    Dec. 6, 2007

Related U.S. Application Data

(63) Continuation of application No. 10/875,360, filed on Jun. 24, 2004, now abandoned.

(51) Int. Cl.
G06F 17/00    (2006.01)
(52) U.S. Cl. .................. 707/720; 707/718; 707/719
(58) Field of Classification Search .................. None
See application file for complete search history.

(56) References Cited

U.S. PATENT DOCUMENTS

| | | | |
|---|---|---|---|
| 5,301,317 | A | 4/1994 | Lohman et al. |
| 5,659,786 | A | 8/1997 | George et al. |
| 5,918,229 | A | 6/1999 | Davis et al. |
| 6,339,773 | B1 | 1/2002 | Rishe |
| 6,353,818 | B1 | 3/2002 | Carino, Jr. |
| 6,779,016 | B1 | 8/2004 | Aziz et al. |
| 6,789,074 | B1 | 9/2004 | Hara et al. |
| 2003/0065648 | A1 | 4/2003 | Driesch, Jr. et al. |
| 2004/0030677 | A1 | 2/2004 | Young-Lai |

Primary Examiner — Debbie Le
Assistant Examiner — Thomas Meng
(74) Attorney, Agent, or Firm — Roy W. Truelson

(57) ABSTRACT

A query access plan for executing a database query is dynamically selected from among multiple alternative query access plans based on the availability of computer resources allocated for running the query. Preferably, a first query access plan is generated based on resources then available, and if it is possible to provide additional resources, one or more alternative plans are generated based on the additional resources. If an alternative plan is significantly better than the original plan based on a comparison of query related parameters, the alternative is chosen for executing the query. Additional resources for running the query may be provided from logically partitioned and/or grid environments.

7 Claims, 5 Drawing Sheets

DYNAMICALLY SELECTING ALTERNATIVE QUERY ACCESS PLANS

CROSS REFERENCE TO RELATED APPLICATIONS

This is a continuation application of U.S. patent application Ser. No. 10/875,360, filed Jun. 24, 2004, entitled "Dynamically Selecting Alternative Query Access Plans", which is herein incorporated by reference. This application claims priority under 35 U.S.C. §120 of U.S. patent application Ser. No. 10/875,360, filed Jun. 24, 2004. The present invention is also related to the following copending and commonly assigned United States patent applications: U.S. patent application Ser. No. 10/787,722, filed Feb. 26, 2004, entitled "Dynamic Optimization of Batch Processing, and U.S. patent application Ser. No. 10/787,639, filed Feb. 26, 2004, entitled "Dynamic Query Optimization", which are incorporated herein by reference and made a part hereof.

BACKGROUND OF THE INVENTION

The present invention relates generally to improved methods, systems, and computer program products for optimizing query processing. More particularly, it relates to optimizing query processing by dynamically selecting alternative query access plans in executing queries.

In typical database querying, query optimizers operate to specify query access or execution plans. Structure Query Language (SQL) queries express what results are requested, but not how the results should be obtained. To implement an SQL statement, a query optimizer is responsible for transforming the SQL statement into a query access or execution plan composed of specific implementations. The query optimizer can select a query access or execution plan for a so-called best method of accessing the data in the database. Typically, this selection is done by generating many different join order strategies, evaluating the processing time of each, and selecting an access plan which can obtain an optimal querying, preferably, within an estimated run time. The access plan would also take into account a combination of optimization data including, but not limited to, an estimated amount of computational overhead, the number of physical Input/Output ("I/O") operations, the execution time, and cost. Known optimizers function to manage query executions in the foregoing fashion. Nevertheless, producing an optimal access plan for any given SQL query statement is a complex problem.

Presently, there are no known approaches for dynamically selecting alternative query access plans based on additional computer resources being available. Moreover, there are no known approaches for dynamically selecting alternative query access plans based on such plans being significantly better than original query access plans as a result of the available additional computing resources. In addition, there are no approaches, whereby such resources to be available are dynamically available from logically partitioned and/or grid environments.

Accordingly, there are needs for methods, systems, and computer program products for dynamically selecting alternative query access plans based on additional computer resources being available. In addition, there are needs for methods, systems, and computer program products for dynamically selecting alternative query access plans based on such plans being significantly better than original query access plans as a result of the available additional computing resources. Furthermore, there are needs for methods, systems, and computer program products, whereby such additional resources are dynamically available from logically partitioned and/or grid environments.

Without such needs being satisfied, the true potential for optimizing query processing will not be entirely satisfied.

SUMMARY OF THE INVENTION

The present invention provides enhanced methods, systems, and computer program products for dynamically selecting alternative query access based on the availability of additional computer resources being allocated for running queries without negative effect and that overcome many of the disadvantages of prior art.

The present invention provides improvements in methods, systems, and computer program products for dynamically selecting alternative query access plans based on them being significantly better than original query access plans as a result of the additional computer resources being allocated.

The present invention provides improvements in methods, systems, and computer program products whereby the resources allocated to provide for the significantly better query access plans are dynamically selected from logically partitioned and/or grid environments.

The present invention provides improvements in methods, systems, and computer program products wherein the significantly better query access plans are based on at least a monitored parameter of an alternative query access plan exceeding a monitored parameter of the original query access plan.

These and other features and aspects of the present invention will be more fully understood from the following detailed description of the preferred embodiments, which should be read in light of the accompanying drawings. It should be understood that both the foregoing generalized description and the following detailed description are exemplary, and are not restrictive of the invention.

DETAILED DESCRIPTION

The present invention provides enhanced methods, systems, and computer program products for dynamically selecting alternative query access plans.

Figure 1:
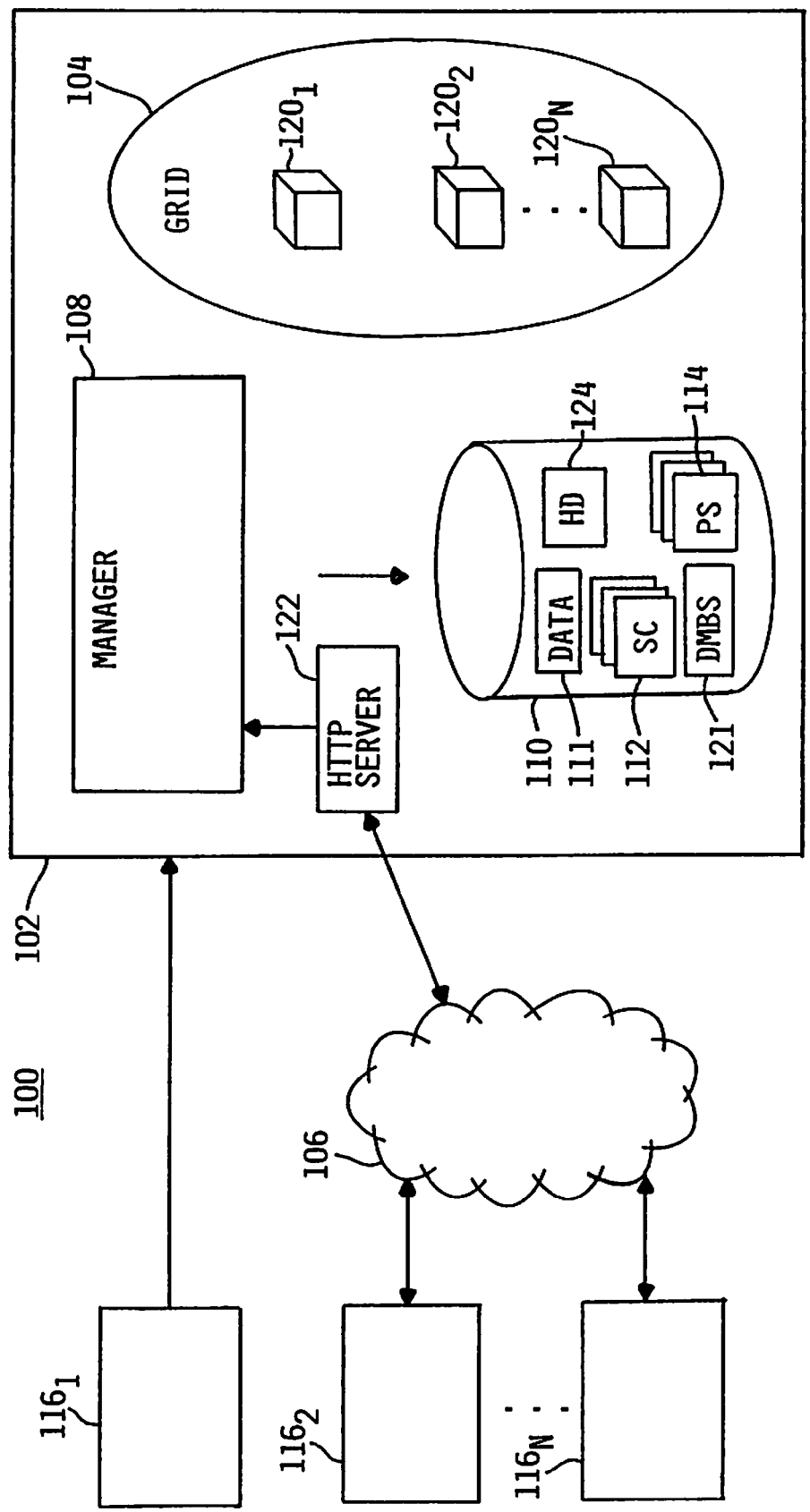
FIG. 1 is a block diagram of an environment having a provider of computing services through a grid environment, in accordance with the present invention.

Referring now to FIG. 1, a data processing environment 100 is illustrated in which the present invention is practiced. Generally, the data processing environment 100 includes a provider computer system 102 and a plurality of one or more computer systems $116_1$-$116_N$ (collectively 116). The provider computer system 102 is illustratively embodied as a server computer with respect to the system users' (client) computer systems 116. Although all computers are illustrated as singular entities, in practice the provider computer system 102 and the client computer systems 116 may all be a network of computers configured to perform various functions, including those described herein. Further, the terms "client" and "server" are utilized merely for convenience and not by way of limitation. As such, the users' computer systems 116, which may be clients relative to the provider computer system 102, in some regards, may themselves be servers relative to one or more other clients (not shown).

The provider computer system 102 and the computer systems 116 communicate through a network 106. The provider computer system 102 provides access to a grid computing environment 104. Access to various resources within the grid computing environment may also be provided by different service providers (not shown). The grid environment 104 may contain a plurality of different computing resources $120_1$-$120_N$ (collectively 120). The grid computing environment 104 may include parallel and distributed computing systems that enable sharing, selection, and aggregation of geographically distributed resources at runtime depending on their availability, capability, performance, cost, and/or user's quality of service requirements. The grid computing environment 104 may be a network including diverse hardware and/or software computing resources. These resources may be allocated and accessible through a network medium such as, the Internet, to a wide variety of users and may be shared between them.

In an exemplary embodiment, the network 106 may be any one of several suitable through which information may be transferred, such as, a local area network (LAN), or a wide area network (WAN), or the like. The provider computer system 102 may be configured with a hypertext transfer protocol (HTTP) server 122 for servicing requests from browser programs residing on the computer systems 116. The HTTP server 122 and the browser programs provide convenient and well-known software components for establishing a network connection (e.g., a TCP/IP connection) via the network 106. The network may include portions of a web services environment.

Referring back to the provider computer system 102, it may be configured with a grid manager 108 that requests grid resources for the computer systems 116. In an exemplary embodiment, the grid manager 108 manages routing requests from the computer systems 116 to the appropriate resources of the grid computing. Such a grid computing system is described in copending and commonly assigned patent application Ser. No. 10/659,976 filed on May 2, 2003, and is incorporated herein by reference and made a part hereof. Some of the requests are fulfilled on a fixed fee basis or a fee basis dependent on at least a parameter (e.g., time) whereby fees are charged dependant on the time needed to process, for example a query program request and/or return a response. The grid manager 108 also monitors progress of the requests by keeping track of time spent on a particular request and calculating an estimated cost of processing. Although, the manager 108 is shown as a single entity, it should be noted that it may be representative of different functions implemented by different software and/or hardware components within the provider computer system 102. The pricing of the processing costs is determined with respect to any variety of pricing criteria including, for example, time-based criteria, request-type or class criteria, priority criteria, historical information, system user identification criteria, and combinations thereof. These pricing criteria are applied to define pricing schedules that the grid manager 108 may access to calculate a cost for a request. In one embodiment, pricing criteria is defined in service contracts 112 stored in a database 110. The database may utilize a database management system (DBMS) 121, such as DB2™, that is commercially available from International Business Machines Corporation, Armonk, NY. The database 110 may also contain historical data (HD) 124 that include a log of requests received and processed in the past, with the corresponding amount of resources utilized and the time taken to process various aspects of the programs. A service contract (SC) may exist for each contractual system user of the provider computer system 102 (i.e., each system user with whom the provider computer system 102 has entered into a legal agreement). In another embodiment, pricing criteria may be specified in generic pricing schedules (PS) 114 for system users who do not have contractual agreements with the service provider. Different generic pricing schedules 114 may exist for a variety of different pricing criteria including those mentioned above (e.g., request-time criteria, request-type or class criteria, priority criteria, historical information, system user identification criteria, and combinations thereof).

Historical information may also serve as criteria for determining pricing and resource allocation schedules when considering a particular implementation as will be described. Pricing schedules may exist that take into account a combination of the one or more pricing and resource allocation criteria. The historical data 124 may be searched to determine whether a similar or same request as the request being considered has been processed in the past. If a similar request is located in the historical data, the information about resources utilized, time and costs taken to process the request may be utilized to select resources for affecting a different query access plan. Of course, each of the criteria mentioned above are optional, and may or may not be utilized in determining pricing and resource allocation schedules, in different embodiments, for selecting alternative optimal query access plans.

Figure 2:
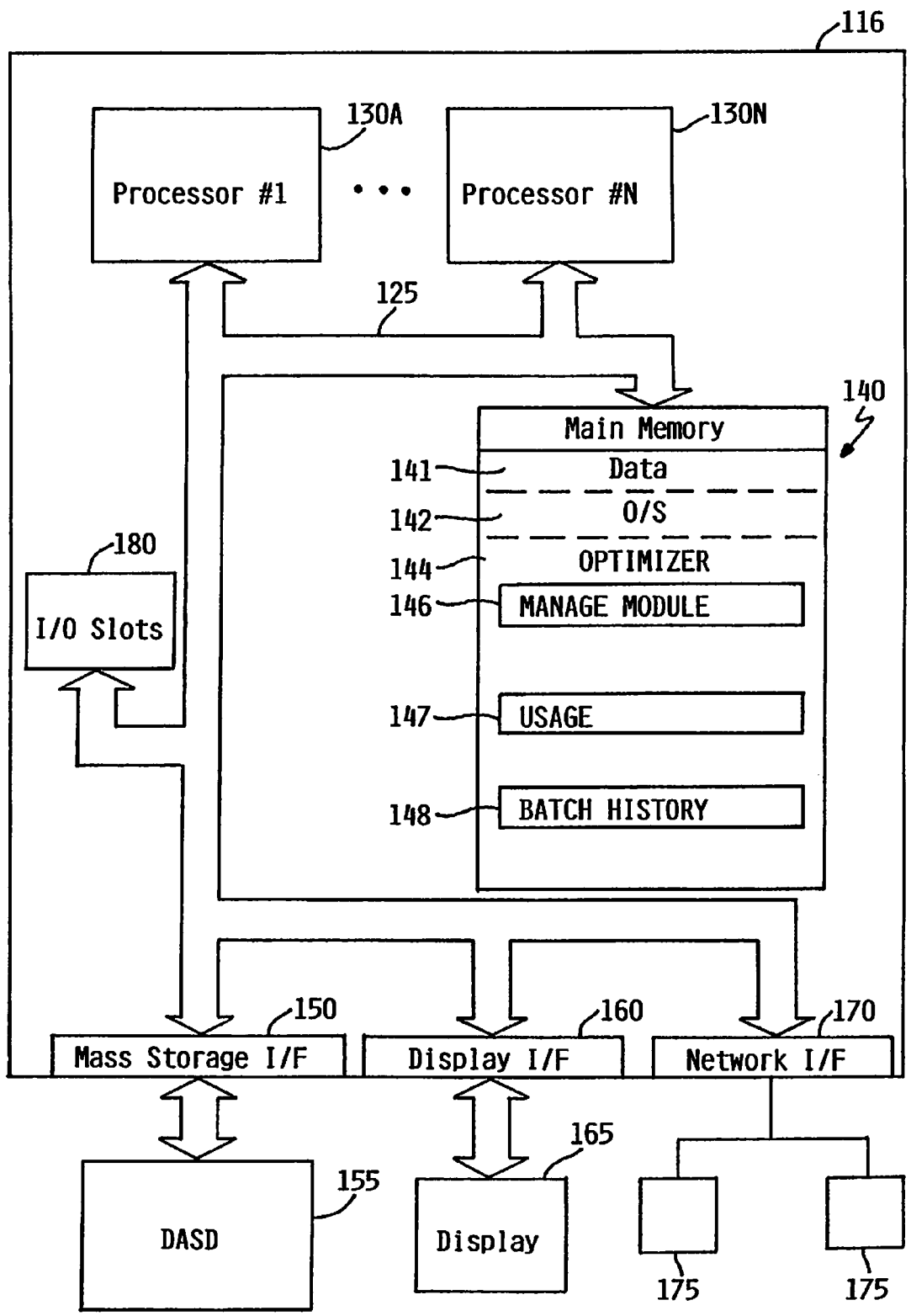
FIG. 2 is a block diagram of a computer system in accordance with one of the preferred embodiments.

Reference is made to FIG. 2 for illustrating a computer system 116, such as an eServer iSeries computer system commercially available from International Business Machines Corporation, Armonk, NY. It will be appreciated that other computer systems are envisioned for use in implementing the present invention and that the illustrated embodiment is exemplary of but one. The computer system 116 comprises one or more processors 130a-n (collectively, 130) that are connected to a main memory 140, a mass storage interface 150, a display interface 160, a network interface 170, and a plurality of I/O slots 180. A system bus 125 interconnects these components. Although only a single bus is illustrated, those skilled in the art will appreciate that the present invention may utilize multiple buses. Each one of the processors may be constructed from one or more microprocessors and/or integrated circuits. The processors execute program instructions in the main memory. The mass storage interface 150 is utilized to connect to mass storage devices, such as a direct access storage device (DASD) 155, for example a suitable CD RW drive, to a computer system. The display interface 160 is utilized to directly connect one or more displays 165 to the computer system 116. The displays 165 may be non-intelligent terminals or fully programmable workstations. The network interface 170 is utilized to connect other computer systems and/or workstations 175 to the computer system 116 across a network. It is pointed out that the present invention applies no matter how many computer systems and/or workstations may be connected to other computer systems and/or workstations and regardless of the network connection technology that is utilized.

The main memory 140 contains data 141 that may be read or written by any of the processors 130 or any other device that may access the main memory. The main memory 140 may include an operating system 142, a query optimizer 144, and a query managing module or mechanism 146. The main memory 140 stores programs and data that the processor may access and execute. The operating system 142 may be a multitasking operating system, such as OS/400™, AIX™, Linux™, or other suitable kind. Those skilled in the art will appreciate that the spirit and scope of the present invention is not limited to any one operating system(s). The operating system 142 includes applications for operating the system. Included in the memory is the query manager module or mechanism 146 which may reside in main memory 140, or, as is known, may reside elsewhere.

The query managing module or mechanism 146 dynamically manages the optimizer's query access plans. The query managing module or mechanism 146 evaluates at least a predefined or key parameter of the first or initial access plan for determining if alternative query access plan are significantly better, and then dynamically allocating additional computer resources if such additional resources are available.

Figure 3:
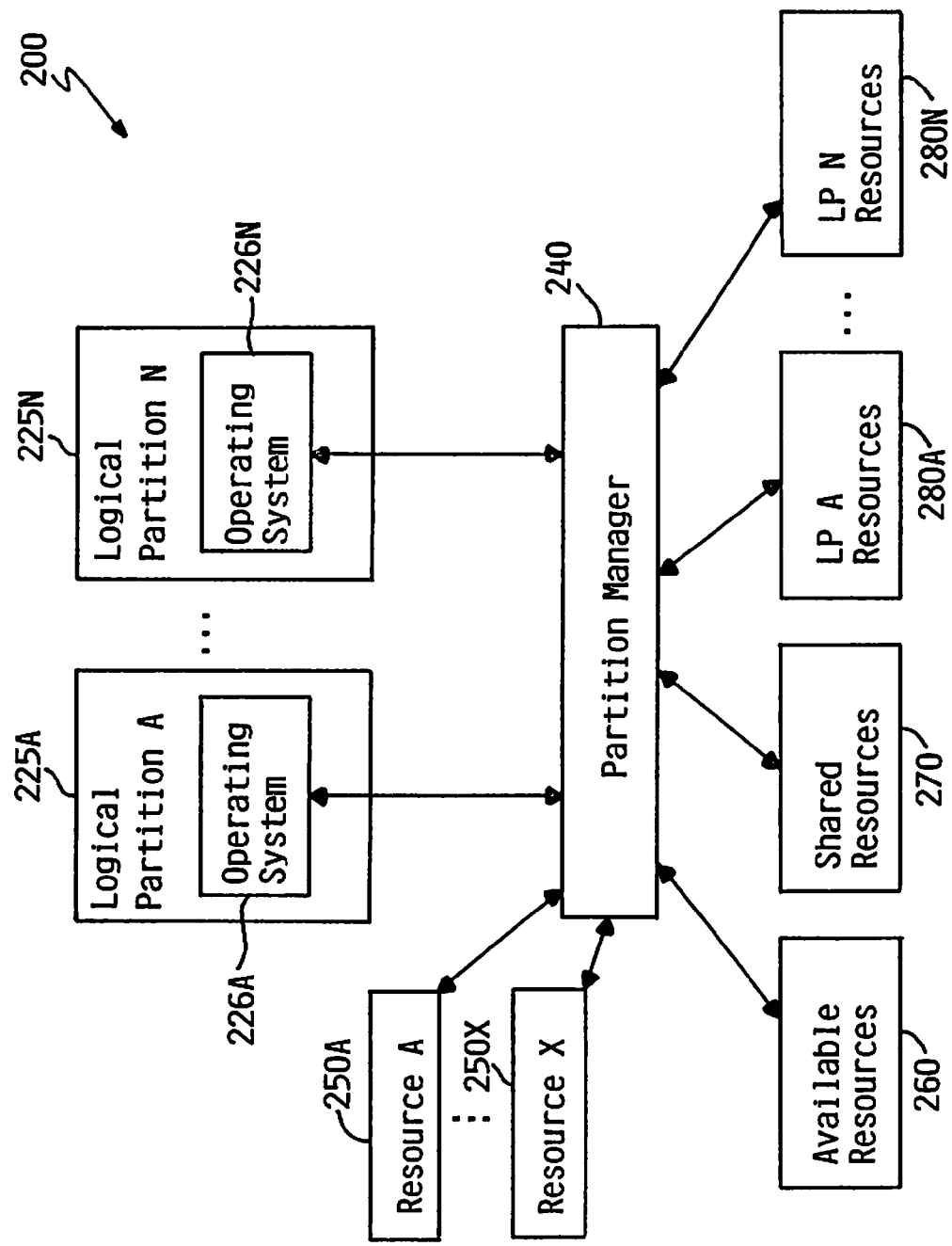
FIG. 3 is a block diagram illustrating logical components in a logically partitioned computer system.

Referring to FIG. 3, one specific implementation of a logically partitioned computer system 200 includes N logical partitions, with each logical partition executing its own respective operating system. In FIG. 3, logical partitions $225_{A-N}$ (collectively 225) are shown executing their respective operating systems $226_{A-N}$ (collectively 226). The operating system 226 in each logical partition may be the same as the operating system in other partitions, or may be a completely different operating system. Thus, one partition can run the OS/400 operating system, while a different partition can run another instance of OS/400, possibly a different release. The operating systems in the logical partitions could even be different from OS/400, provided it is compatible with the hardware. The logical partitions 225 are managed by a partition manager 240. One example of suitable partition manager 240 is known as a "Hypervisor" that is commercially available from International Business Machine Corporation. The partition manager 240 manages resources 250, shown in FIG. 3 as resource 250. As used in the present application, a "resource" as used in this invention may be any hardware or software or combination thereof that may be controlled by partition manager 240. Examples of hardware resources include processors, memory, and hard disk drives. Examples of software resources include a database, internal communications (such as a logical LAN), or applications (such as word processors, e-mail, etc.). The partition manager 240 controls which resources 250 may be allocated/de-allocated by the logical partitions 225. A resource, once made available to the partition manager 240, is categorized as an available resource 260 if it has not yet been assigned to a logical partition, is categorized as a shared resource 270 if multiple logical partitions may access the resource, and is categorized as a dedicated resource $280_{A-N}$ (collectively 280) if it has been exclusively assigned to a logical partition.

Figure 4:
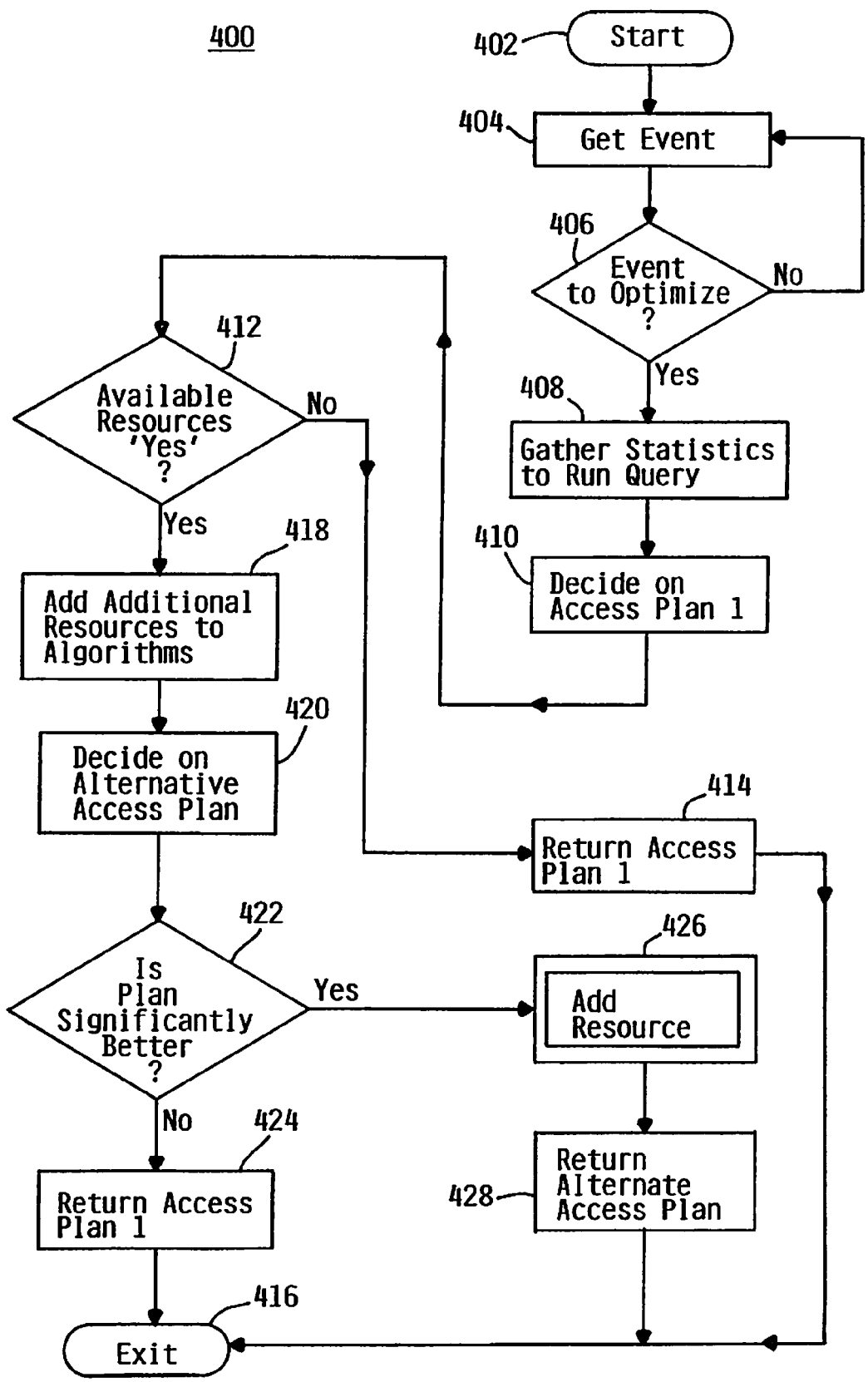
FIG. 4 represents an exemplary flow diagram illustrating the determining of alternative query access plans.

The exemplary steps of a query managing method 400 of this invention are illustrated in FIG. 4. Essentially, it is implemented by the data processing system 100 and the query managing mechanism or module 146. As a result, improved performances of query executions are achieved by selecting alternative query access plans which are, preferably, significantly better than an original query access plan. In addition, additional resources are dynamically added to the dynamically selected alternative query access plans.

In step 402, the query managing method 400 Starts. In block 404, a query event is obtained for query execution in accordance with the present embodiment. In the Event to Optimize block 406, a decision is made as to whether or not this query is to be optimized or not. Factors involved in this decision may include determining not to optimize a query access plan after reviewing historical data concerning such a plan or similar plan to determine that it uses a minimal amount of resources (e.g., computing time). Besides computing time other similar factors may be used. If the decision in the Event to Optimize block 406 is negative (i.e., No) then the query managing method 400 returns to the Get Event block 404 for another query event. If the decision in the Event to Optimize block 406 is affirmative (i.e., Yes) then the process in the block 408 follows in which the query managing method 400 collects statistics from the data processing system 100 that may be used for purposes of generating query access plans. The collected data include statistics covering system memory, CPU, I/O devices' memory, bit maps, indexes, etc, and other factors used for generating query execution plans.

In a Decide on Access Plan block 410 which follows, the query optimizer, as is known, generates a particular query access or execution plan. The query access plan (e.g., Plan 1) is selected and is intended to implement processing of the query being evaluated with the resources that are currently available. Following the steps of the Decide on Access Plan block 410, the process proceeds to Is Available Resource block 412.

In the Is Resource Available block 412, a decision is made as to whether available computer resources are available from, for example, a grid or partitioned environment for when the query is run against the database. The additional computer resources available (e.g., CPU) may be selected in preconfigured additional increments and/or based on cost by the cost usage module 147 which will predict the cost of the additional resources and may compare it to user preferences as to whether the additional resources may be utilized. If No is the decision in the Is Resource Available block 412, then the query managing method 400 proceeds to a Return to Access Plan 1 block 414. Thereafter, the query managing method 400 then Exits in the block 416, whereby the original query access Plan 1 is to be processed. Alternatively, should the decision in the Is Additional Resource Available block 412 be Yes, then the query managing method 400 proceeds to Add or Allocate Resources to Algorithms block 418.

In the Add Additional Resources to Algorithms block 418, known optimizer algorithms are utilized for generating alternative access plans. The optimizer algorithms may incorporate valuations of the additional available computer resources determined in the block 416 for generating the alternative query access plans. The valuations of the additional computer system resources cover system memory, CPU, I/O devices' memory, bit maps, indexes, etc, and other factors used for generating query execution plans. The resulting alternative query access plans are to be evaluated subsequently, as will be described. Typically, the more memory and/or CPU available for running a query the more improved the query access plan will be. For example, with more memory and/or CPU, a resulting query access plan will result in faster query execution times. Following the adding of the additional resources to the algorithm steps performed in the block 418, the query managing method 400 proceeds to Decide on Alternative Access Plan block 420.

In the Decide on Alternative Access Plan block 420, the optimizer may generate alternative query access plans based on the computer resource valuations of the available resources including the additional resources. The alternative query access plan that is selected in the block 420 essentially modifies the first query access plan (Plan 1). In this regard, the same key parameters used by the optimizer for generating the initial or first query access plan are utilized here for generating the alternative query access plan. The same key data may be related to optimization data, such as memory, CPU, I/O's, query execution time or the like. Typically, the more memory and CPU available for running a query the more improved the query access plan will be. For example, with more memory and/or CPU, a resulting query access plan will result in faster query execution times.

The alternative query access plan that is selected is forwarded to the Is Plan Significantly Better block 422. In the Is Plan Significantly Better block 422, a comparison is made as to whether or not the new alternative query access plan is significantly better than the original. Specifically, the determination is based on a comparison of the query related parameters, such as if query execution time of the alternative query access plan is better by a preconfigured amount (e.g., greater than) than that of query access Plan 1. In one preferred embodiment, the decision is Yes, if the new alternative query access plan runs at a query execution time that is faster than the query execution time of Plan 1. For example, the query execution time is predicted to be 15 seconds with Plan 1, and the alternative query access plan may run the query in 2 seconds. While the value of the parameter of Plan 1 exceeds the actual numerical value of the new query access plan, the value of the new query access plan parameter exceeds that of Plan 1 because a faster running query is considered significantly better. The concept of what constitutes a better parameter value relative to another parameter value is dependent on the type of parameter that is selected. Other valuation differentiations may be considered applicable as well. For example, other valuations may be related to minimizing the amount of memory and/or tempspace used. If the determination in the Is Plan Significantly Better block 422 is negative (i.e., No) then the optimizer returns to the original plan established in the Return to Access Plan 1 block 424.

Figure 5:
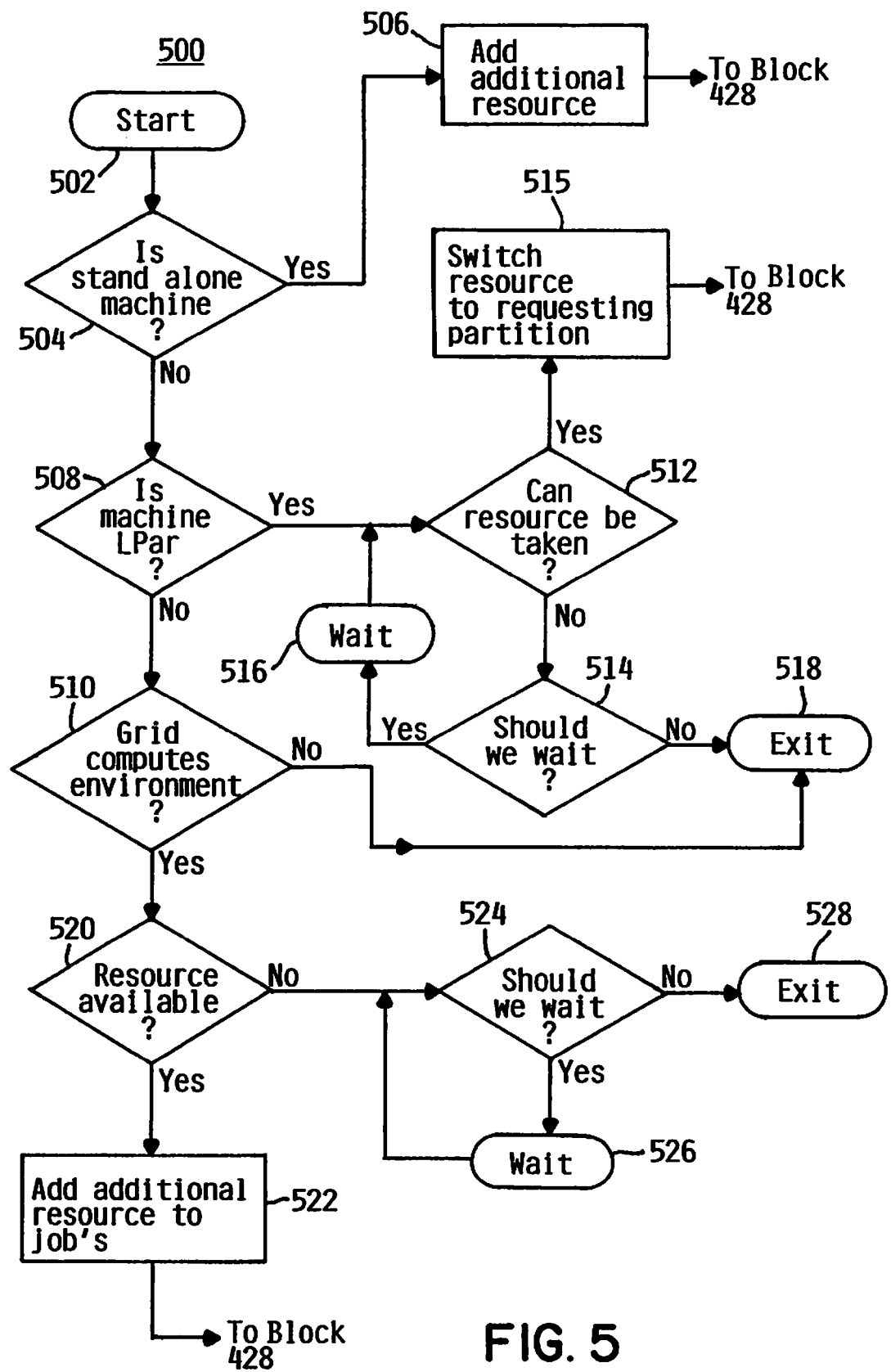
FIG. 5 represents an exemplary flow diagram for allocating resources to a computer system, according to one embodiment of the present invention.

Following this step, the query managing method 400 proceeds to the Exit block 416 at which point the query managing method 400 terminates and the query may be run. Basically, the query managing method 400 collects key data from the available computer resources as such data relate to key query optimizer parameters. The collected data include statistics covering system memory, CPU, I/O devices' memory, bit maps, indexes, etc, and other factors used for generating query execution plans. Alternatively, if Yes is the decision made in the Is Plan Significantly Better block 422, then the query managing method 400 goes to the Add resources block 426. FIG. 5 is exemplary of a process for implementing the Add resources block 426.

FIG. 5 illustrates the process 500 of dynamically allocating additional computer resources consistent with the alternative query access plan generated in the Decide on Alternative Access Plan block 420. The allocating additional computer resources process 500 commences at Start block 502. In the Is Stand-alone Machine decision block 504, a determination is made as to whether the query processing is to be performed on a stand-alone or unpartitioned computer system. If Yes, then an Add or Allocate Additional Resources block 506 follows. In the block 506, an algorithm is applied to determine an allocation of computer resources value related to the amount of resources (e.g., extra CPU, memory) that should be allocated to running the query to reduce the query execution time to at least a predefined value consistent with the new or alternative query access plan. The data from the block 506 is forwarded to the alternative query access Plan 1 in the block 428. On the other hand, if No, then an Is Machine LPAR block 508 follows.

A determination is made In the Is Machine LPAR block 508 as to whether the query processing is to be performed on an unpartitioned computer system or not. If the determination is No, then the process proceeds to the Grid Computes Environment block 510. Alternatively, if the decision is Yes, then Can Resource Be Taken block 512 follows. In the Can Resource Be Taken block 512, a decision is made as to whether or not the additional resources to be added when the query is to be run are available. In this regard, the partition manager determines the timing and amount of computer resources that are to be available during the actual query running process. In the block 512, the determination is made based on availability from other logical partitions. If Yes, then the process of block 515 is performed in which the partition manager is operated to presently shift such resources from other partitions to the requesting partition. Once the determination is made to switch resources it is communicated so as to be available when the query is run then block 428 is performed. On the other hand, if a No determination is made in block 512, then the process of block 514 is performed. In the block 514, a determination is made as to whether the process can wait, an appropriate time, for additional resources from other partitions before the current query run is negatively impacted. The appropriate time may be any suitable predefined threshold value which if exceeded causes interference with the query runtime. If Yes, then block 516 follows in which the process waits a predetermined period of time below the threshold value before looping back to the block 512. If No, then Exit block 518 is performed at which point the Add Resource block 426 (FIG. 4) is complete and the process 500 proceeds to the Return Alternative Access Plan block 428 (FIG. 4).

As noted earlier, if a No decision is decided in the block 508, then the steps of a Grid Computer Environment block 510 is performed. In the Grid Computer Environment block 510, a decision is made by the grid manager 108 as to whether or not the computer systems of the grid are available for running the query running when the query is to be run. If a No decision is made, then Exit block 518 follows. Alternatively, if a Yes decision is made, then Is Resource Available block 520 follows.

In the Is Resource Available block 520, a determination is made as to whether or not resources may be obtained from the grid computing environment. If Yes, then Add Additional Resources to Query block 522 is performed, wherein additional grid resources will be allocated when the query is actually run. Alternatively, if the decision in block 520 is No, then Should We Wait block 524 is performed. In the block 524, a determination is made as to whether the query can wait for a time before grid resources may be allocated. If there is adequate time for waiting, then Wait block 526 applies a wait for a predetermined time before resubmitting the request to the Should We Wait block 524. Alternatively, if the decision in the Should We Wait block 524 is negative (i.e., No), then the Exit block 528 follows in which the process then proceeds to the Return to Alternative Access plan block 428 (FIG. 4). From the Return to Alternative Access plan block 428, the process proceeds to the Exit block 416.

It will, therefore, be appreciated that the present invention provides an improved system, and method for improving performance of query executions by selecting alternative query access plans as a function of providing additional allocations of computer resources in response evaluations of an initial query access plan.

One aspect of the invention is implemented as a program product for use with a computer system or environment. The program(s) of the program product defines functions of the embodiments (including the methods described herein) and may be contained on a variety of signal-bearing media. Illustrative signal-bearing media include, but are not limited to: (i) information permanently stored on non-writable storage media (e.g., read-only memory devices generally within a computer such as CD-ROM disks readable by a CD-ROM drive); (ii) alterable information stored on writable storage media (e.g., floppy disks generally within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature utilized is merely for convenience. Thus, the invention should not be limited to use solely in any specific application identified and/or implied by such nomenclature.

The embodiments and examples set forth herein were presented to explain best the present invention and its practical applications, thereby enabling those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above-exemplary embodiments illustrated in the drawings, specific terminology has been utilized for the sake of clarity. However, the invention is not intended to be limited to the specific terms selected. It is to be understood that each specific term includes all technical equivalents that operate in a similar manner to accomplish a similar purpose. Many modifications and variations are possible in light of the above teachings without departing from the spirit and scope of the appended claims.

What is claimed is:

1. A method of providing fee-based processing in a processor system, whereby fees are based on additional computer resources being added for enabling provision of alternative query access plans, the processor system including at least one processor; a memory coupled to the at least one processor, a query optimizer residing in the memory; and, a manager residing in the memory and executable by the at least one processor, said method comprising the steps of:

executing said query optimizer using a base set of computer processor and memory resources of said processor system to generate a first query access plan for executing a query, wherein each of at least some query access plans generated by said query optimizer is optimized to be executed using a respective set of computer processor and memory resources subsequent to being generated by said query optimizer, and wherein said first query access plan is optimized to be executed using said base set of computer processor and memory resources subsequent to being generated by said query optimizer;

executing said query manager using said base set of computer processor and memory resources to evaluate said first query access plan by determining whether additional computer resources are available to execute said query, said additional computer resources being fee-based computer resources comprising at least one of processor resources and memory resources in addition to said base set of computer processor and memory resources, wherein determining whether additional computer resources are available is based on a cost of said additional computer resources;

responsive to determining that said additional computer resources are available to execute said query, executing said query optimizer using said base set of computer processor and memory resources to generate an alternative query access plan for executing said query, wherein said alternative query access plan is optimized to be executed using an alternative set of computer processor and memory resources subsequent to being generated by said query optimizer, said alternative set including said base set of computer processor and memory resources and said additional computer resources;

executing said query manager using said base set of processor and memory resources to determine whether a parameter value of the alternative query access plan exceeds a corresponding parameter value of the first query access plan to justify the cost of said additional computer resources, whereby the alternative query access plan is improved over the first query access plan; and responsive to determining that the parameter value of the alternative query access plan exceeds the corresponding parameter value of the first query access plan, dynamically adding the additional computer resources for executing the alternative query access plan and executing the alternative query access plan using said alternative set of computer processor and memory resources, wherein the manager dynamically adds the additional computer resources based on determining the cost for usage for the additional computer resources.

2. A method for executing a query, comprising the computer-implemented steps of:

executing a query optimizer using a base set of computer processor and memory resources of a computer system to automatically generate a first query access plan for executing said query, wherein each of at least some query access plans generated by said query optimizer is optimized be to executed using a respective set of computer processor and memory resources subsequent to being generated by said query optimizer, and wherein said first query access plan is optimized to be executed using said base set of computer processor and memory resources subsequent to being generated by said query optimizer;

subsequently determining that an augmented set of computer processor and memory resources is available to execute said query, said augmented set including said base set of computer processor and memory resources and at least some additional computer resources not included in said base set, said additional computer resources being fee-based computer resources including at least one of processor resources and memory resources, wherein determining that an augmented set of computer processor and memory resources is available is based on a cost of said additional computer resources;

responsive to said step of subsequently determining that an augmented set of computer processor and memory resources is available to execute said query, executing said query optimizer using said base set of computer processor and memory resources to automatically generate a second query access plan for executing said query, said second query access plan being different from said first query access plan, wherein said second query access plan is optimized to be executed using said augmented set of computer processor and memory resources subsequent to being generated by said query optimizer;

comparing at least one execution parameter of said first query access plan with a corresponding at least one execution parameter of said second query access plan;

if said at least one execution parameter of said second query access plan is significantly better than said at least one execution parameter of said first query access plan to justify the cost of said additional computer resources, then dynamically allocating said additional computer resources for executing said query, and executing said query according to said second query access plan using said augmented set of computer processor and memory resources; and if said at least one execution parameter of said second query access plan is not significantly better than said at least one execution parameter of said first query access plan, then executing said query according to said first query access plan using said base set of computer processor and memory resources.

3. The method of claim 2, wherein the additional computer resources are provided by one or more additional partitions in a logically partitioned environment.

4. The method of claim 2, wherein the additional computer resources are provided by a networked computer grid environment.

5. The method of claim 2, wherein the additional computer resources are added based on determining the cost for usage.

6. The method of claim 2, further comprising gathering statistics of computing resources including additional computer resources if available for determining the second query access plan.

7. The method of claim 2, wherein said step of comparing at least one execution parameter of said first query access plan with a corresponding at least one execution parameter of said second query access plan comprises comparing a relative cost for usage for said base and augmented sets of computer resources.

* * * * *